United States Patent Office 3,677,798
Patented July 18, 1972

3,677,798
POLYMERIC CHROMIUM SULFATOZIRCONATE COMPOSITIONS, THEIR PREPARATION AND USE
Warren B. Blumenthal, North Tonawanda, N.Y., assignor to N L Industries, Inc., New York, N.Y.
No Drawing. Original application Apr. 19, 1967, Ser. No. 631,906, now Patent No. 3,540,839. Divided and this application Nov. 12, 1970, Ser. No. 89,148
Int. Cl. B44d 1/14
U.S. Cl. 117—62.1   9 Claims

ABSTRACT OF THE DISCLOSURE

Polymeric chromium sulfatozirconates are produced by reduction of chromium compounds such as alkali metal dichromates in sulfuric acid to form chromic sulfate, reacting said sulfate with an acid soluble zirconium compound, and heating the reaction product to at least about 80° C. Organic fibrous webs and glass surfaces are rendered water-repellent by forming thereon adsorbates by reaction of the sulfatozirconates with alkali metal soaps of fatty acids.

---

This is a division of application Ser. No. 631,906, filed Apr. 19, 1967, now Pat. 3,540,839.

BACKGROUND OF THE INVENTION

The present invention relates to novel compositions useful for rendering fibrous materials water repellent and resistant to attack by fungi and other microorganisms, and for improving the bonding of film-forming and other materials to fibrous materials.

A great many materials have previously been suggested and used for the stated purposes. For example, water repellence has been achieved by application of aluminum, zinc, or zirconium soaps, with or without waxes; bonding has been achieved with dimethylolurea; the destructive action of microorganisms has been suppressed with copper quinolinolate. However, no completely satisfactory treatment has been found for accomplishing all three results.

SUMMARY OF THE INVENTION

It has been found that a high level of water repellence and good resistance to attack by microorganisms can be imparted to textiles by application thereto of adsorbates formed from certain novel polymeric chromium sulfatozirconates and fatty acids. The exact constitution and structure of these adsorbates is not known, but it is believed that they differ from chromium and zirconium soaps in structure and composition.

The novel polymeric chromium sulfatozirconates of the present invention are prepared by reducing, in sulfuric acid solution, chromic acid (in the presence of alkali metal ions) or a dichdomate of an alkali metal to obtain a chromic sulfate solution having an acidic reaction; reacting said solution with an acid-soluble zirconium compound; and heating the reaction product to at least about 80° C. to obtain the unique desired water-soluble, polymeric product.

The reaction of the chromic sulfate solution and the acid-soluble zirconium compound produces a chromium sulfatozirconate, typically having empirical compositions corresponding to: $(CrO)_2Zr(SO_4)_3$ and $CrOHZr(SO_4)_3$, the exact basicity depending on the composition of the solution in which it is formed. Such chromium sulfatozirconates tend to be polymeric but, as first formed in solution, are not useful for the purposes of the present invention. Only after undergoing structural changes associated with polymerization and resulting from heating the solution, with or without reducing the solute to dryness, to at least about 80° C. are the novel polymeric chromium sulfatozirconate compositions of the present invention obtained from the reaction products.

In treating fibrous materials for the purposes above described, adsorbates formed by the reaction of the novel polymeric chromium sulfatozirconates and fatty acids are deposited on the surfaces of the fibers.

DESCRIPTION OF THE INVENTION

The production of novel polymeric chromium sulfatozirconate compositions according to the present invention is illustrated in the following examples.

EXAMPLE 1

To a mixture of 298 g. of sodium dichromate and 600 g. of concentrated sulfuric acid there is slowly added, with stirring, a solution of 40 g. of methanol in 60 g. of water. There is formed a viscous liquid which contains chromic sulfate and sodium bisulfate as a very concentrated solution. To this solution is added 250 g. of hydrous zirconium carbonate (containing 91 g. of zirconium) which is soluble in acids and which reacts with the chromic sulfate. On drying the reaction mass in an oven at 90° C. for 16 hours, a dried product is obtained that is water-soluble and does not hydrolyze in dilute aqueous solutions. The dried product contains a novel polymeric chromium sulfatozirconate and sodium bisulfate.

EXAMPLE 2

A mixture is formed of 298 g. of sodium dichromate and 600 g. of concentrated sulfuric acid. Into this is stirred 150 g. of an aqueous solution of formaldehyde containing 56.3 g. of the latter, the formaldehyde serving as a reducing agent. To the resulting aqueous solution containing chromic sulfate and sodium bisulfate is added 250 g. of hydrous zirconium carbonate (assaying 91 g. of zirconium). The solut ion resulting from the ensuing reaction is dried for about 18 hours at 90° C. to yield a water soluble product containing a novel polymeric chromium sulfatozirconate and sodium bisulfate.

EXAMPLE 3

A solution of 40 g. of methanol in 60 g. of water is slowly added with stirring to a mixture of 298 g. of sodium dichromate and 600 g. of concentrated sulfuric acid. There is produced a viscous, aqueous solution of a mixture of chromic sulfate and sodium bisulfate. To this is added 250 g. of sodium zirconium silicate which reacts with the chromic sulfate. When the resultant mixture is dried at 90° C. there is obtained a product which contains the desired novel water-soluble, polymeric chromium sulfatozirconate along with sodium bisulfate and a water-insoluble siliceous residue. The latter can be filtered off, if desired, when the polymeric chromium sulfatozirconate is dissolved although for some purposes it may remain in suspension in the solution.

EXAMPLE 4

The process as described in Example 1 may be carried out as set forth except for substituting 252 g. of ammonium dichromate for the sodium dichromate specified. The product then contains besides the desired water-soluble, polymeric chromium sulfatozirconate, ammonium bisulfate.

Instead of the chromium and zirconium compounds used in the processes illustrated in the preceding examples, the novel polymeric chromium sulfatozirconates may, for example, be produced from a mixture of chromic acid and a soluble alkali metal compound such as the carbonate or hydroxide as a source of chromic sulfate and from zirconyl chloride or zirconyl nitrate as a source of zirconium. Preferably an atomic ratio of from 1:1 to 1:2 zirconium to chromium is used in the production of the novel polymeric chromium sulfatozirconates, but ratios as low as 1:3 may be employed. Other organic reducing agents may also be used, if desired.

The novel polymeric chromium sulfatozirconate of the present invention are distinguished from mixtures of chromium and zirconium salts by their resistance to hydrolysis with the formation of insoluble hydrolysates in dilute solution and are characterized by their ability to impart water repellence when used in very dilute solutions.

As stated above, such polymeric chromium sulfatozirconates are useful and effective, as adsorbates with fatty acids, in imparting water repellence to organic fibrous webs such as textiles and paper. This is illustrated in the following example.

EXAMPLE 5

A piece of cotton cloth is boiled for 30 minutes in a 2% aqueous sodium carbonate solution to remove oil, grease, adhering solids, and other foreign matter, and rinsed thoroughly. It is then saturated by dipping it into a 0.25% aqueous solution of sodium stearate and wrung by passing it between two tightly pressed rubber rollers so that it contains about its own weight of solution. It is next saturated by dipping in an aqueous solution of a polymeric chromium sulfatozirconate such as that obtained in Example 1, assaying approximately 0.02% Zr and 0.023% Cr, and again wrung out to about the same liquid content as before. After drying the cloth at 90° C., preferably while tumbling it, the two dipping steps and their accompanying wringing steps are repeated and the cloth is again dried at 90° C.

Textiles treated as described in the preceding example when tested in the ASTM Spray Test D 583-63 have a water repellence rating of 100. The water repellence persists after washing with dry-cleaning solvents and laundering with soap and water. This improvement is thought to result from the relatively firm bonding of the adsorbate formed with the polymeric chromium sulfatozirconate by the fatty acid of the soap in the solution to the surfaces of the cloth fibers. The amount of adsorbate produced on the fabric will, of course, vary with the type of fabric as well as the solution concentrations and other process variables. In general, however, good results may be obtained with as little as about 0.5%. Ordinarily amounts greater than about 3–5% will not be desirable since the flexibility and appearance of the fabric are unfavorably affected if an excessive amount of adsorbate is present.

Other textiles such, for example, as those made of linen, jute, acrylics (such as "Acrilan," a trademark of Monsanto Co.), and polyesters (such as "Dacron," a trademark of E. I. du Pont de Nemours & Co.) may also be rendered water repellent by treatment such as described above. In treatments of the type described other water soluble soaps of alkali metals and ammonium with fatty-acids having 14–18 carbon atoms may be used alone or in admixture instead of sodium stearate. The concentration of the soap solution used may vary, a concentration in the range from about 0.05% to 2.0% being practical. The concentration of the polymeric chromium sulfatozirconate solutions (calculated to a Zr basis) may convenient vary from about 0.01% to 1.5%. To protect sensitive textiles against the possibility of acid tenderizing, it is desirable to adjust the pH of the polymeric chromium sulfatozirconate to 4.0–4.5 with a mild base such as ammonium carbonate and high levels of water repellence are obtained at such acidities. While the temperature employed for drying the textile after the first dipping in the metal salt solution is not critical, in the second drying step it is important to employ a temperature of at least 70° C. and preferably from about 90° C. to 140° C. The temperatures of the treating solutions are not critical and they may conveniently be applied at room temperature.

It will be understood that the absorbates may be used in the treatment of the textile yarns, both staple and monofilament, and non-woven fabrics as well as in the treatment of woven fabrics. For example, paper webs (including sheets) may be rendered water repellent by a process essentially the same as that described in Example 5. If desired, the treating solutions may be applied to paper webs by spraying instead of dipping.

It has been found that fabrics and paper treated by a process like that described in Example 5 also exhibit improved resistance to attack by microorganisms such as those that cause rotting and mildewing. Resistance to such microorganisms is also found in paper made from fibers which have been contacted with the novel polymeric chromium sulfatozirconates of the invention in the holding tank or head box of a paper making machine. The proportion of polymeric chromium sulfatozirconate required for the purpose ranges from about 0.01% to 0.4% of the suspending water, on a zirconium basis.

Still greater resistance to attack by microorganisms can be obtained in textiles and paper by adding to the polymeric chromium sulfatozirconate solution used, a water soluble salt of a metal such as copper, nickel, and mercury in an amount equivalent to from about 0.01 % to 2.0% of the added metal, although about 0.01% to 0.02% is usually satisfactory.

It is to be noted that while chromium salts and zirconium salts may be used separately or together with soap solutions to treat fabrics, the water-repellent properties of fabrics so treated are not substantial. It is further to be noted that the novel, polymeric, chromium sulfatozirconates of the present invention which are effective for imparting water repellence to fabrics and paper are only obtained when the reaction product of an acid soluble zirconium compound with chromic sulfate as described in the preceding examples is heated to a temperature from about 80° C. to 105° C. or boiling.

A process such as described in Example 5 is also effective in providing water repellence to siliceous, inorganic textiles and the surface of other siliceous articles such as those of glass.

Treatment with the novel polymeric chromium sulfatozirconates described herein may also be employed to improve the bonding of glass surfaces to adhesives and resinous materials.

Percentages given herein and in the appended claims are percentages by weight except as otherwise indicated. As used in this application "alkali metal" is intended to include the alkali metals of Group I of the Periodic series of elements and ammonium.

What is claimed is:

1. A process for imparting water repellance, and resistance to attack by microorganisms to a textile which comprises: immersing said textile in a first aqueous solution of an alkali metal soap of a fatty acid, wringing said textile, immersing said textile in a second aqueous solution of a treating composition, wringing, and drying and repeating both said immersing and wringing steps, followed by drying said textile at a temperature of at least 70° C.; said treating composition being a water soluble polymeric chromium sulfatozirconate-containing composition prepared by reacting chromic sulfate, formed by reduction by an organic reducing agent of a sulfuric acid solution of a composition selected from the group consisting of chromic acid in the presence of alkali metal ions, and an alkali metal dichromate, with an acid-soluble zirconium compound in amounts to give an atomic ratio of zirconium to chromium of no less than 1:3 and heating the reaction product to a temperature in the range of about 80° C. to boiling.

2. A process as set forth in claim 1 in which said textile is a woven web.

3. A process as set forth in claim 1 in which said textile is a non-woven web.

4. A process as set forth in claim 1 in which said second solution is employed at a pH of 4.0 to 5.0.

5. A process as set forth in claim 1 in which the concentration of said soap in said first solution is from about 0.05% to 2.0%.

6. A process as set forth in claim 5 in which the concentration of polymeric chromium sulfatozirconate in said second solution is from about 0.01% to 1.5% calculated to a Zr basis and said web is finally dried at a temperature of about 90° C.

7. A process as set forth in claim 1 in which the concentration of polymeric chromium sulfatozirconate in said second solution is from about 0.01% to 1.5% calculated to a Zr basis.

8. A water repellent textile resistant to attack by microorganisms produced by the process of claim 1.

9. A process for imparting water repellance to a glass surface which comprises applying to said surface a first aqueous solution of an alkali metal soap of a fatty acid, then applying thereto a second aqueous solution of a treating composition, drying said surface and repeating the applications and finally drying said surface at a temperature of at least 70° C.; said treating composition being a water soluble polymeric chromium sulfatozirconate-containing composition prepared by reacting chromic sulfate, formed by reduction by an organic reducing agent of a sulfuric acid solution of a composition selected from the group consisting of chromic acid in the presence of alkali metal ions, and an alkali metal dichromate, with an acid-soluble zirconium compound in amounts to give an atomic ratio of zirconium to chromium of no less than 1:3 and heating the reaction product to a temperature in the range of about 80° C. to boiling.

References Cited
FOREIGN PATENTS 606,681    8/1948    Great Britain.

WILLIAM D. MARTIN, Primary Examiner

D. COHEN, Assistant Examiner

U.S. Cl. X.R.

117—124A, 126 GQ, 126 GF, 140 R, 143 R, 135.5